C. H. VAN MAANEN.
LUBRICATING DEVICE FOR PISTON RODS.
APPLICATION FILED MAY 14, 1913.
1,142,642.
Patented June 8, 1915.
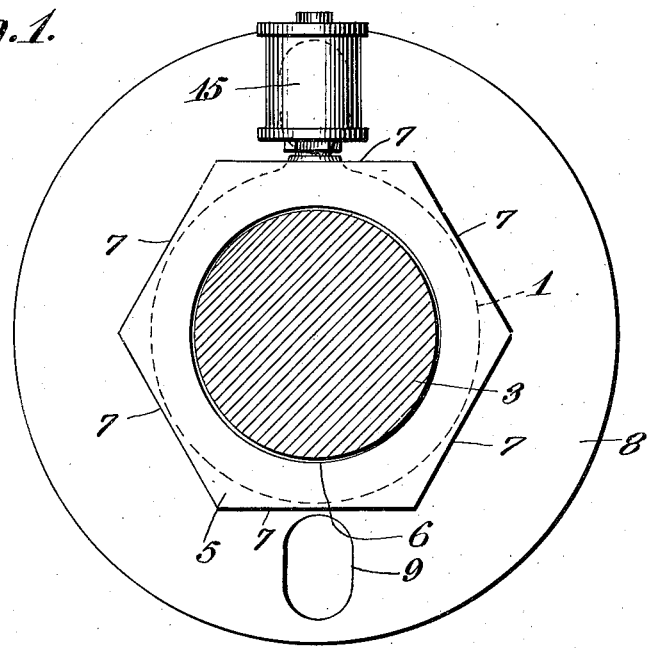
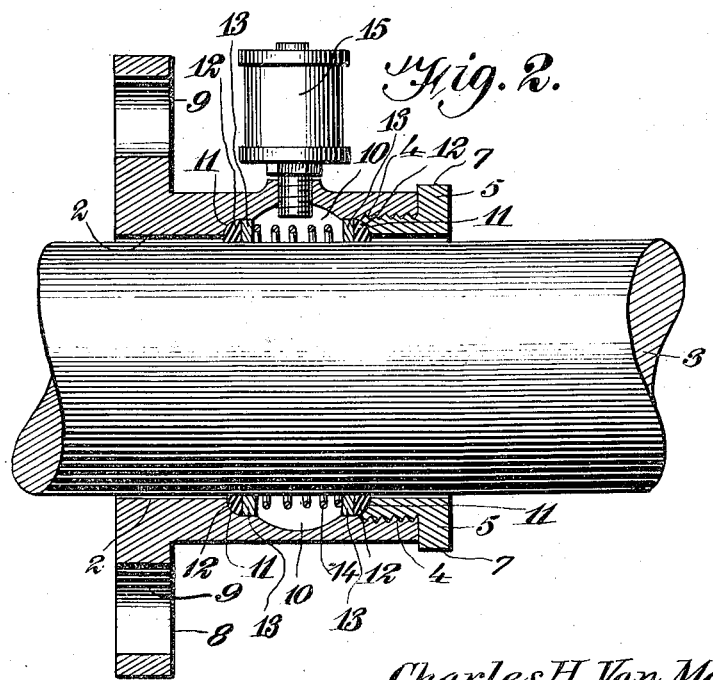
Inventor
Charles H. Van Maanen
Witnesses
Raymond L. Gilbert
P. M. Smith
By Victor J. Evans
Attorney

UNITED STATES PATENT OFFICE.

CHARLES HENRY VAN MAANEN, OF CENTRAL CITY, KENTUCKY.

LUBRICATING DEVICE FOR PISTON-RODS.

1,142,642.  Specification of Letters Patent.  Patented June 8, 1915.

Application filed May 14, 1913. Serial No. 767,638.

*To all whom it may concern:*

Be it known that I, CHARLES HENRY VAN MAANEN, a citizen of the United States, residing at Central City, in the county of Muhlenberg and State of Kentucky, have invented new and useful Improvements in Lubricating Devices for Piston-Rods, of which the following is a specification.

This invention relates to lubricating devices for piston rods, the object of the invention being to provide a simple, practical and reliable device of the character referred to which is applicable to any piston rod, for the purpose of evenly and uniformly spreading the lubricating material over the entire surface of the piston rod throughout the extent of its travel, at the same time compensating for any wear between the piston rod and the body or casing of the lubricating device, so as to prevent the excessive leakage of oil from the lubricating device.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is an end elevation of the lubricating device of this invention, showing the piston rod in cross section. Fig. 2 is a diametrical section through the lubricating device, taken at right angles to Fig. 1, and showing the piston rod in elevation.

The lubricating device contemplated in this invention comprises a hollow and preferably cylindrical body or casing 1 provided in one end thereof with an opening 2 of a size slightly greater than the external diameter of the piston rod, shown at 3, in connection with which the lubricating device is used. It will, of course, be understood that the size of the lubricating device will be governed entirely by the size of the piston rod in connection with which it is used.

At its opposite end, the casing 1 is internally screw threaded, as shown at 4, to receive a correspondingly threaded detachable end section 5 having an opening 6 therein slightly larger than the external diameter of the piston rod 3. This detachable section 5 is preferably formed with a circumferential flange, having flat wrench engaging faces 7 adapting the same to be turned with the aid of a suitable wrench, until it fits tightly within the threaded end of the casing 1.

The main section of the casing is provided with an attaching flange 8 flush with one end thereof, as clearly shown in Fig. 2, said attaching flange being provided at suitable points with holes 9 to receive screws, bolts, or other fasteners, by means of which the lubricating device as a whole is fastened to a suitable part of the engine, such as the cylinder.

Centrally and internally, the main section of the casing 1 is provided with an oil cavity 10 which is annular, in that it extends entirely around the inner wall of the casing and around the piston rod 3, said cavity being substantially semi-circular in cross section, as clearly shown in Fig. 2.

At opposite sides of the groove or channel 10, the casing is hollowed out to form packing ring grooves 11 substantially quadrant-shaped in cross section, one of such grooves being partly formed in the inner edge of the detachable section 5 of the casing. In these quadrant-shaped grooves are placed packing rings 12 of corresponding shape and preferably composed of some such material as asbestos, which will prevent the oil from passing through the openings at opposite ends of the lubricating device, and thereby avoid excessive leakage of oil or other lubricating material.

Bearing against the inner adjacent faces of the packing rings 12 are follower rings 13 of some such metal as brass, said rings encircling the piston rod 3 and being normally held in engagement with the packing rings 12 and pressed apart with the required force by means of a coiled expansion spring 14, which encircles the piston rod 3 and exerts its pressure in opposite directions against the follower rings 13. At one side of the casing, and preferably at the top side thereof, is an oil cup 15 which communicates with the lubricating space 10 in the center of the casing.

From the foregoing description, it will now be seen that the oil or lubricating material is applied directly to the entire outer surface of the piston rod 3, throughout the extent of throw of said rod, and that the expansion spring 14 operates in both directions to compress the packing rings 12 in their grooves and against the surface of the piston rod, thereby preventing leakage of the oil from the casing of the lubricator, while permitting sufficient oil to adhere to the surface of the piston rod. The detachable section 5 may be removed for the purpose of renewing the packing and follower rings, as well as the expansion spring 14, while the oil cup 15 enables additional lubricating material to be introduced into the central chamber of the device, as frequently as may be necessary.

What is claimed is:

A lubricating device for piston rods comprising a casing having a longitudinal bore adapted to loosely receive said piston rod, a pair of spaced flexible packing rings mounted on the piston rod and having outer ball faces adapted to fit in correspondingly shaped grooves in said casing and inner flat faces, spaced follower rings rectangular in cross section contacting with the entire inner faces of the said packing rings and having their peripheral edges contacting with the walls of the groove, a coil spring interposed between said follower rings, an oil cup threaded into said casing and communicating with the space between said follower rings, and a tubular cap threaded into one end of said casing for allowing the insertion of said rings and coil spring.

In testimony whereof I affix my signature in presence of two witnesses.

CHARLES HENRY VAN MAANEN.

Witnesses:
C. A. LAWTON,
JAS. B. LAWTON.